March 9, 1926.
C. P. McCORMACK
1,575,852
BENEFICIATION OF ORES
Filed May 5, 1925
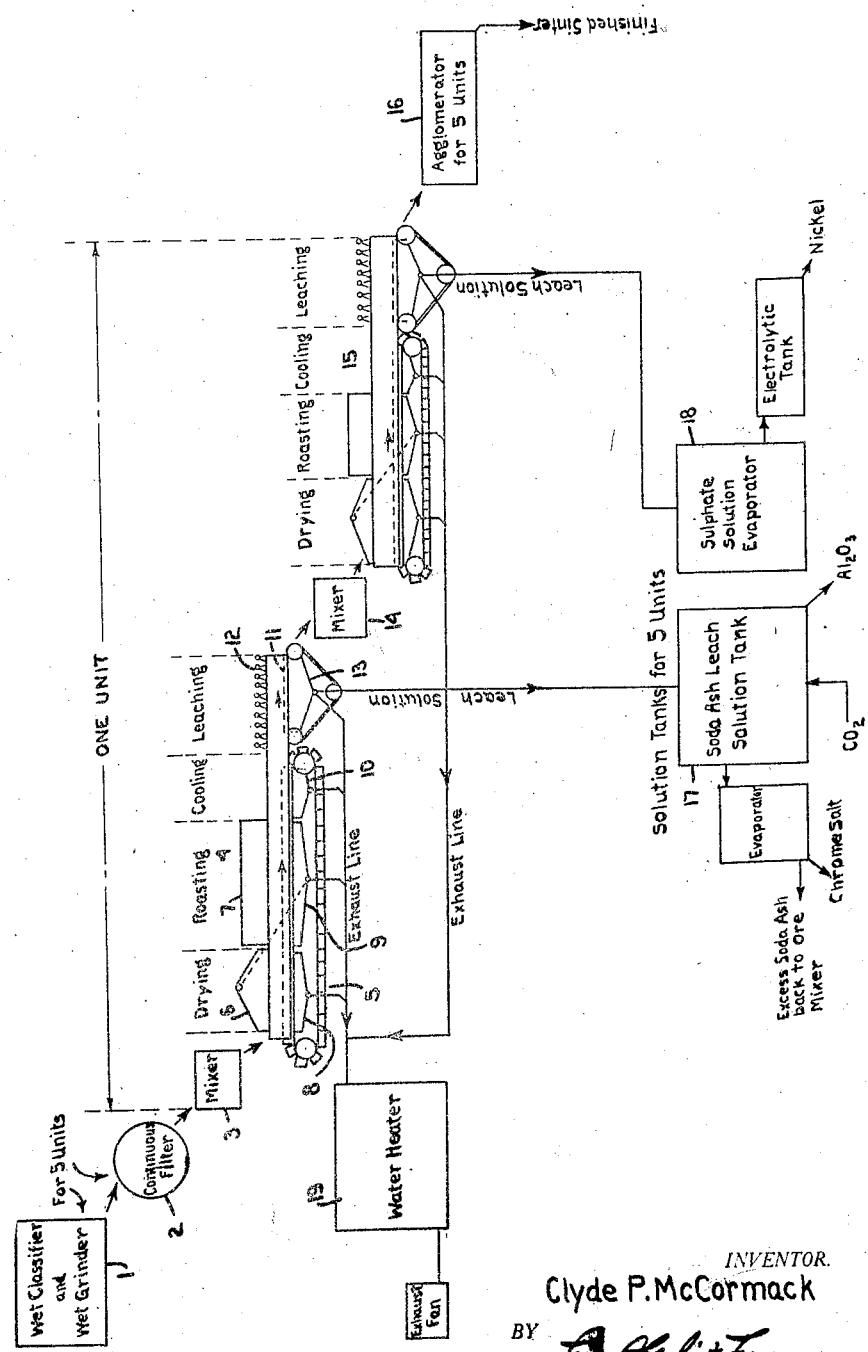
INVENTOR.
Clyde P. McCormack
BY
ATTORNEYS.

Patented Mar. 9, 1926.

1,575,852

UNITED STATES PATENT OFFICE.

CLYDE P. McCORMACK, OF CLEVELAND, OHIO.

BENEFICIATION OF ORES.

Application filed May 5, 1925. Serial No. 28,090.

*To all whom it may concern:*

Be it known that I, CLYDE P. MCCORMACK, a citizen of the United States, and a resident of Cleveland, county of Cuyahoga, and State of Ohio, have invented a new and useful Improvement in the Beneficiation of Ores, of which the following is a specification, the principle of the invention being herein explained and the best mode in which I have contemplated applying that principle, so as to distinguish it from other inventions.

The present improvements relate more particularly to a method of treating an oxidized iron ore or metal-bearing product containing aluminum, chromium and nickel. Typical of such iron ores are the soft iron ores of the north coast of the island of Cuba, which consist essentially of oxides of iron and alumina and contain relatively small amounts of the metals chromium and nickel, such iron ore in its raw state being non-merchantable due to very high moisture and volatile content in addition to such alumina, chromium and nickel.

The object of the present invention is to beneficiate such an ore by removing the aluminum, chromium and nickel in such form that these valuable constituents may be segregated and utilized in any way that may be desired, and at the same time, and principally, the iron oxide is substantially freed from such other metals and is in form fit for blast furnace smelting. To the accomplishment of the foregoing and related ends, said invention, then, consists of the steps hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In said annexed drawing:—

The single figure there appearing is a diagrammatic representation, on the order of a flow sheet, illustrating both the sequence of steps and the arrangement of a typical apparatus adapted to carry out the present improved method or process.

The steps of the process will first be set forth and such detail description of the apparatus then given as is deemed necessary.

The raw ore, which as mined contains a rather high percentage of water, is conveyed to the treatment plant where it is first passed through a suitable wet classifier, preferably a Dorr bowl classifier, the fine overflow of minus 60 mesh being removed and the remaining coarse discharge being wet ground to the same fineness as the overflow. The two products are then placed together and constitute, in effect, the raw material of the process. A typical analysis of such material where derived from the aforesaid Cuban ores, ignoring the water content, is as follows:—

Dry iron: 45.00%, phosphorus: .020%, silica: 4.50%, alumina: 13.50%, manganese: 0.75%, chromium: 1.50%, nickel: 0.80%, loss on ignition: 13.30%.

Such raw material is next dewatered in a suitable machine, preferably a continuous Oliver filter, and thereupon such dewatered ore is intimately mixed with soda ash (sodium carbonate), either dry or as a slurry, in the proportion of one ton of ore to 1000 pounds, more or less, of soda ash. This mixture of soda ash and ore is then roasted, under oxidizing conditions, at a temperature varying between 750° C. and 950° C., depending upon the time of roast, which may vary correspondingly between two hours and one hour. This roast converts the alumina (to a controllable extent) and the chromium into water soluble sodium salts.

As a result of such roasting, moreover, substantially all free and combined water and volatiles will be driven off from the mixture. After the latter has been cooled somewhat it is then leached with hot water, as a result of which the aforesaid sodium salts of aluminum and chromium will be dissolved out. This solution is conveyed into a precipitating tank where carbon dioxide gas, either from a suitable generator or from purified combustion gases, is passed therethrough, precipitating the alumina which settles out. The remaining solution is evaporated, during which evaporation the chromium salts crystalize out and the excess sodium carbonate is recovered to be used over in the aforesaid roasting step; or else a suitable precipitating agent is used to precipitate such chromium, either as such or in the form of a salt, and the remaining solution is then evaporated down to proper soda ash strength to be used over again, as just stated.

The consumption of soda ash required in the foregoing stage of the process will be approximately fifty pounds per ton of leached ore. The aluminum will be removed from the original ore to an extent varying from substantially all thereof to any desired percentage. All but a trace of the chromium will be removed from such original ore and the leached ore will now contain between 58 per cent and 62 per cent of natural iron, depending upon the extent of removal of alumina.

The next step in the process is to intimately mix the leached ore with finely ground pyrite in the ratio of one ton of such leached ore to 450 pounds of pyrite, more or less, depending on the condition of the ore and the time allowed for the succeeding step. This step consists in roasting the aforesaid mixture under oxidizing conditions at a temperature varying between 460° C. and 700° C., depending on the time of roast, which may vary correspondingly between one hour and twenty minutes. As a result of this step all or substantially all of the contained nickel is converted to water soluble nickel sulphate.

The roasted mixture of ore and pyrite is then cooled and leached with hot water. The solution after the leach will carry the nickel as nickel sulphate and is conveyed to a tank, with or without evaporation to a concentrated form, where the nickel is deposited on cathodes electrolytically, or else the solution is treated with a proper reagent that will precipitate the nickel as such or in the form of a salt.

The ore now freed of constituents: "loss on ignition," alumina, chromium and nickel, and containing a high percentage of iron, but in a finely divided form and wet from the last leaching, is dried and agglomerated in a suitable sintering machine, giving an iron ore fit for blast furnace smelting. The final product is a merchantable Bessemer iron ore containing between 58 per cent and 62 per cent natural iron. In addition, as a result of the several purification and extraction steps, 350 pounds, more or less, of pure alumina is obtained, about 40 pounds of chromium salts and about 18 pounds of nickel from between one and eight-tenths and two tons of mined Cuban ore having approximately the analysis hereinbefore given. The present process renders the beneficiation and purification of such ores economically and commercially feasible and, as may be readily shown, will yield a substantial margin of profit on the extraction and treatment of such ores.

The equipment illustrated in the drawing, it will be understood, constitutes but a single unit of a plant designed for carrying out the present improved process. It will also be understood that in referring to special items of such equipment there is no intention to imply any limitation, but that any equivalent piece of apparatus suitable for carrying out the operation involved may be substituted.

The first element in such illustrative equipment, as previously indicated, consists of a Dorr bowl classifier 1, in which the overflow removes the minus 60 mesh ore and the coarse discharge is wet-crushed to the same fineness as such overflow. The two products are then intermixed and discharged onto a continuous dewatering device 2, preferably an Oliver continuous filter, which will dewater the collected fine ore from the aforesaid wet classifier and wet grinder. One such wet classifier, wet grinder and dewatering machine will ordinarily suffice to prepare enough crude or for a number, e. g. five, of the succeeding beneficiating units which will now be described.

The first element in each such unit is a suitable mixing device 3, such as a pug mill, in which the fine and dewatered ore is intimately mixed with the proper amount of soda ash, either in a dry state or as a slurry. The mixture from such mill is then received in a continuous drying and roasting and cooling and leaching machine 4, wherein the soda ash roasting and the succeeding leaching steps are accomplished. This machine will preferably include a traveling pan conveyor with screened bottom, onto which the mixed ore and soda ash is fed in a bed of between four and eight inches in depth and from four to six feet in width. Such conveyor first carries the mixture under a drier hood 6 that is heated by waste gases from the following roasting hood 7, these waste gases being drawn down through the ore bed as it slowly travels along this zone by means of an exhaust hood 8 placed beneath the conveyor. The dried ore bed on the conveyor is next carried under such roasting hood 7, where heat, varying between 750° C. and 900° C. is supplied by means of coal or oil, or mixed coal and oil burners, or by electric heaters, the products of combustion being drawn down through the ore bed by means of an exhaust hood 9 placed beneath the conveyor. As will be readily understood it is in this roasting zone that the alumina and chromium are converted to sodium salts and at the same time the volatile constituents that figure as "loss on ignition" in the analysis of the raw ore are driven out. The conveyor finally travels through a cooling zone where cold air is drawn down through the ore bed by means of a third exhaust hood 10 placed beneath the conveyor as before.

The ore bed on such conveyor, which, as indicated, ends at about the end of such cooling zone, is then picked up by an endless traveling filter sheet 11, composed of a suitable filtering material, supported on a belt of suitable screening, which passes underneath a series of jets 12 of hot water. Such water, charged with a certain amount of steam or, not as found preferable in the particular operation, leaches out the sodium salts, the filtering of the leaching solution being aided by a suction hood placed beneath the filter sheet, which serves to draw the solution down through the ore bed.

At the end of the leaching zone the material is discharged from the filter sheet into a suitable mixing device 14 which intimately mixes the leached ore with the proper amount of finely ground pyrite and the mixture is thence discharged on to the succeeding machine 15, which is a substantial duplicate of the machine 4 except that its length is somewhat less, or else its speed greater inasmuch as the action with the pyrite is more rapid. As clearly indicated on the drawing the ore bed as received from the mixing device 14 is first conveyed through a drying zone and then in succession through a roasting zone, a cooling zone and a leaching zone. In the latter, jets of boiling water leach out the nickel sulphate in the same manner as the water soluble aluminum and chromium salts were leached out in the preceding machine. At the end of the leaching zone the solid residuum is discharged onto a sintering machine 16 of standard design, which is adapted to agglomerate the finely divided material and discharge the same in the form of a merchantable iron ore suitable for blast furnace smelting. Ordinarily one such sintering machine will serve a plurality, e. g., five of the beneficiating apparatuses, just as a corresponding number of the latter will be supplied for one classifier, grinder and filter.

In both machines 4 and 15 stationary rabbles (not shown) are placed at proper intervals across the traveling ore bed through the entire length of the machine, i. e., in all of the component zones thereof, to agitate the ore bed in order that the several aforesaid actions may be most efficiently performed. It will be understood of course that the lengths of the several zones, as indicated in the drawing, are only approximate inasmuch as these will be determined by the speed of travel of the ore bed, or vice versa.

The solutions from the leaching zones in machines 4 and 15 are conveyed to suitable tanks 17 and 18, respectively and such solutions there treated in the manner hereinbefore set forth in order to recover the alumina, chrome salts and soda ash in the one case and the nickel in the other. The leaching water from the two machines will desirably be heated in a suitable heat exchange device 19 by the waste gases from the roasting zones of said machines. The exhausting hoods will be provided with proper by-passes and the desired degree of vacuum obtained by means of an exhausting fan or its equivalent.

The small manganese content present in the original ore, as indicated in the analysis hereinbefore given, may remain in the finished product or not without affecting the beneficial results of the treatment that constitutes the present invention. Any reference to the disposition of such manganese has accordingly been omitted.

Other modes of applying the principle of my invention may be employed instead of the one explained, change being made as regards the steps herein disclosed, provided those stated by any of the following claims or their equivalent be employed.

I therefore particularly point out and distinctly claim as my invention:—

1. In a method of beneficiating an oxidized iron ore or metal-bearing product containing aluminum, the step which consists in roasting such ore with soda ash under oxidizing conditions, whereby a controlled amount of such aluminum is converted into a water-soluble sodium salt.

2. In a method of beneficiating an oxidized iron ore or metal-bearing product containing aluminum and chromium, the step which consists in roasting such ore with soda ash under oxidizing conditions and at a temperature of approximately 750° to 950° C., whereby the chromium and a controlled amount of the aluminum are converted into water-soluble sodium salts.

3. In a method of beneficiating an oxidized iron ore or metal-bearing product containing aluminum and chromium, the steps which consist in roasting such ore with soda ash under oxidizing conditions and at a temperature of approximately 750° to 950° C., whereby the chromium and a controlled amount of the aluminum are converted into water-soluble sodium salts, and then leaching out such salts.

4. In a method of beneficiating an oxidized iron ore or metal-bearing product containing aluminum, the step which consists in roasting such ore with soda ash, whereby a controlled amount of such aluminum is converted into a water-soluble sodium salt.

5. In a method of beneficiating an oxidized iron ore or metal-bearing product containing aluminum and chromium, the step which consists in roasting such ore with soda ash, whereby the chromium and a controlled amount of the aluminum are converted into water-soluble sodium salts.

6. In a method of beneficiating an oxidized iron ore or metal-bearing product containing aluminum and chromium, the steps which consist in roasting such ore with soda ash, whereby the chromium and a controlled amount of the aluminum are converted into water-soluble sodium salts, and then leaching out such salts.

7. In a method of beneficiating an oxidized iron ore or metal-bearing product containing aluminum, chromium and nickel, the steps which consist in roasting such ore with soda ash, whereby the chromium and a controlled amount of the aluminum are converted into water-soluble sodium salts; leaching out such salts; roasting the residue with a sulphur-bearing material, whereby the nickel is converted to water-soluble nickel sulphate; and then leaching out such sulphate.

8. In a method of beneficiating an oxidized iron ore or metal-bearing product containing aluminum, chromium and nickel, the steps which consist in roasting such ore with soda ash, whereby the chromium and a controlled amount of the aluminum are converted into water-soluble sodium salts; leaching out such salts; roasting the residue with a sulphur-bearing material, whereby the nickel is converted to water-soluble nickel sulphate; and then leaching out such sulphate, such first roasting step being conducted at a higher temperature than the second.

9. In a method of beneficiating an oxidized iron ore or metal-bearing product containing aluminum, chromium and nickel, the steps which consist in roasting such ore with soda ash, whereby the chromium and a controlled amount of the aluminum are converted into water-soluble sodium salts; leaching out such salts; roasting the residue with a sulphur-bearing material, whereby the nickel is converted to water-soluble nickel sulphate; and then leaching out such sulphate, both of the foregoing roasting steps being conducted under oxidizing conditions.

10. In a method of beneficiating an oxidized iron ore or metal-bearing product containing aluminum, chromium and nickel, the steps which consist in roasting such ore with soda ash, whereby the chromium and a controlled amount of the aluminum are converted into water-soluble sodium salts; leaching out such salts; roasting the residue with a sulphur-bearing material, whereby the nickel is converted to water-soluble nickel sulphate; and then leaching out such sulphate, both of the foregoing roasting steps being conducted under oxidizing conditions, and the first such step being conducted at a higher temperature than the second.

11. In a method of beneficiating an oxidized ore or metal-bearing product containing aluminum, chromium and nickel, the steps which consist in roasting such ore with soda ash, whereby the chromium and a controlled amount of the aluminum are converted into water-soluble sodium salts; leaching out such salts; roasting the residue with a sulphur-bearing material, whereby the nickel is converted to water-soluble nickel sulphate; and then leaching out such sulphate, such first roasting step being conducted at a temperature of approximately 750° C. to 950° C., and such second roasting step at a temperature of approximately 460° C. to 700° C.

12. In a method of beneficiating an oxidized iron ore or metal-bearing product containing aluminum, chromium and nickel, the steps which consist in roasting such ore with soda ash, whereby the chromium and a controlled amount of the aluminum are converted into water-soluble sodium salts; leaching out such salts; roasting the residue with a sulphur-bearing material, whereby the nickel is converted to water-soluble nickel sulphate; and then leaching out such sulphate, both of the foregoing roasting steps being conducted under oxidizing conditions, and such first roasting step being conducted at a temperature of approximately 750° C. to 950° C., and such second roasting step at a temperature of approximately 460° C. to 700° C.

13. In a method of beneficiating an oxidized iron ore or metal-bearing product containing aluminum, chromium and nickel, the steps which consist in converting the aluminum and chromium into the form of water-soluble salts; leaching out such salts; and then converting the nickel into the form of a water-soluble salt and leaching out such salt.

14. In a method of beneficiating an oxidized iron ore or metal-bearing product containing aluminum, chromium and nickel, the steps which consist in converting the aluminum and chromium into the form of water-soluble sodium salts; leaching out such salts; and then converting the nickel into the form of a water-soluble salt and leaching out such salt.

15. In a method of beneficiating an oxidized iron ore or metal-bearing product containing aluminum, chromium and nickel, the steps which consist in converting the aluminum and chromium into the form of water-soluble salts; leaching out such salts; and then converting the nickel into nickel sulphate and leaching out such sulphate.

16. In a method of beneficiating an oxidized iron ore or metal-bearing product containing aluminum, chromium and nickel, the steps which consist in converting the aluminum and chromium into the form of water-soluble sodium salts; leaching out such salts; and then converting the nickel into nickel sulphate and leaching out such sulphate.

17. In a method of beneficiating an oxidized iron ore or metal-bearing product containing aluminum, chromium and nickel, the steps which consist in converting the aluminum and chromium into the form of water-soluble salts; leaching out such salts; then converting the nickel into the form of a water-soluble salt and leaching out such salt; and agglomerating the solid residuum.

18. In a method of beneficiating an oxidized iron ore or metal-bearing product containing aluminum, chromium and nickel, the steps which consist in converting the aluminum into the form of water-soluble salts; leaching out such salts; then converting the nickel into the form of a water-soluble salt and leaching out such salt; and sintering the solid residuum.

Signed by me, this 2nd day of May, 1925.

CLYDE P. McCORMACK.